United States Patent [19]

Costemalle et al.

[11] Patent Number: 5,376,438
[45] Date of Patent: Dec. 27, 1994

[54] MULTILAYER TIRE SIDEWALL

[75] Inventors: Bernard Costemalle, Rhode-St-Genese, Belgium; Douglas D. Flowers, Woodbridge; James V. Fusco, Red Bank, both of N.J.; Marcel Steurs, Boortmeerbeek, Belgium

[73] Assignee: Exxon Chemical Patents Inc., Linden, N.J.

[21] Appl. No.: 14,946

[22] Filed: Feb. 8, 1993

[51] Int. Cl.$^5$ .................................................. B32B 7/02
[52] U.S. Cl. ................................. 428/216; 428/323; 428/493; 428/515; 428/521; 428/517; 525/354
[58] Field of Search .................. 428/517, 493, 323, 519, 428/521, 216; 524/286; 525/354

[56] References Cited

U.S. PATENT DOCUMENTS

| 3,508,595 | 10/1967 | Wilson | 152/330 |
|---|---|---|---|
| 3,630,974 | 12/1971 | Ladocsi et al. | 260/5 |
| 3,830,274 | 8/1974 | Waser | 152/355 |
| 3,865,763 | 2/1975 | Feniak | 260/5 |
| 4,224,196 | 9/1980 | Gursky | 260/3.5 |
| 4,548,995 | 10/1985 | Kowalski et al. | 525/354 |
| 5,063,268 | 11/1991 | Young | 524/286 |
| 5,162,445 | 11/1992 | Powers et al. | 525/333.4 |

FOREIGN PATENT DOCUMENTS

WO92/03302 3/1992 WIPO .

*Primary Examiner*—Edith Buffalow
*Attorney, Agent, or Firm*—J. E. Schneider; M. B. Kurtzman

[57] ABSTRACT

The invention is a multilayer tire sidewall having an outer layer prepared from a blend of isomonoolefin/-para-alkylstyrene copolymer and general purpose rubbers. The inner layer comprises general purpose rubber. The resulting sidewall exhibit good ozone resistance and fatigue crack resistance as well as a reduction in staining and discloration.

16 Claims, No Drawings

MULTILAYER TIRE SIDEWALL

FIELD OF THE INVENTION

The present invention relates to tire sidewalls which exhibit improved ozone resistance, and fatigue crack propagation resistance as well as a reduction in staining and discoloration. The tire sidewall comprise an outer-layer comprising a blend of a halogenated copolymer of isoolefin and para-alkylstyrene with one or more general purpose rubbers and at least one inner layer comprising a blend of general purpose rubbers.

BACKGROUND OF THE INVENTION

Rubber tires, such as pneumatic tires, include many components, such as, for example, sidewalls. Sidewalls are continuously subjected to distortion under normal road operating conditions. The sidewalls are subjected to extensive continuous flexing and can crack under such conditions. In addition to flex cracking, sidewalls are also subjected to atmospheric chemical action such as ozone attack. The overall effect is that the sidewalls may erode and degrade. The sidewall may even separate from the tire carcass during use leading to tire failure.

To reduce the problems caused by ozone attack and flex cracking, tire manufacturers add chemical protectants to the general purpose rubbers used in tire sidewalls. The problem with these protectants is that they tend to be fugative and can cause staining when in contact with white sidewalls. In some cases, and in particular white sidewalls, polymer blends have been used to effect improvement in ozone and flex resistance.

A composition which attempts to overcome these problems is disclosed in U.S. Pat. No. 3,508,595 to Wilson and assigned to the General Tire & Rubber Company. This patent discloses a blend of chlorobutyl rubber, natural rubber, and ethylene propylene terpolymer as the protective cover for the white sidewalls used in pneumatic tire construction.

U.S. Pat. No. 3,630,974 to Ladosci, et al., assigned to Exxon Research and Engineering Company, further discloses the use of terpolymers blended with high unsaturation rubbers to enhance their ozone resistance. The patent also discloses a triblend of halobutyl rubber, ethylene propylene terpolymer and a high unsaturation rubber to improve dynamic ozone resistance and heat flex resistance. The terpolymer used in the blends comprise ethylene, propylene and a diene. The high unsaturation rubbers include natural rubber, styrene butadiene rubber and polybutadiene rubber. Among the various fillers disclosed in this patent are various "oils" along with resin, waxes, etc. The patent teaches the use of 10 parts oil per 100 parts rubber in the blends. In addition, the terpolymer used in the blends should not comprise more than 10 to 20% of diolefin.

U.S. Pat. No. 3,865,763 to Fenicek, assigned to Polysar, Limited, is primarily concerned with stabilization of halogenated butyl rubber with boron compounds. Example 5, however, appears to disclose a combination of brominated butyl rubber with both ethylene propylene rubber and styrene butadiene rubber.

U.S. Pat. No. 3,830,274 to Wesser, Jr., assigned to the Goodyear Tire and Rubber Company, discloses yet another elastomer blend for use in pneumatic tire sidewall compositions. The blend comprises an ethylene propylene nonconjugated diene terpolymer along with bromobutyl rubber and cis-1.4 polyisoprene rubber such as natural or synthetic rubber, along with a rubbery cis-1.4 polybutadiene with a specified molecular weight distribution. This blend allegedly provides substantially improved hot flex-life and carcass adhesion properties for tire sidewalls.

U.S. Pat. No. 4,224,196 discloses a sidewall composition having improved flex resistance, wherein the blend composition comprises a blend of halobutyl rubber, a highly unsaturated rubber and oil extended EPDM rubber.

Published International Application PCT/US91/05666 filed Aug. 9, 1991 discloses a tire sidewall composition comprising a single layer prepared from a blend of a halogenated copolymer of isoolefin and para-alkylstyrene with one or more general purpose rubber. While these blends exhibit superior ozone resistance and flex cracking resistance, the cost of the copolymer prohibit its broad use in tire sidewalls.

It is desirable, therefore, to reduce the amount of copolymer present in the sidewall to an economically feasible level while preserving the improved properties it offers.

SUMMARY OF THE INVENTION

As noted above, it has been found that the use of blends of halogenated copolymers of isoolefin and para-alkylstyrene with general purpose rubbers yield tire sidewall compositions having significantly improved performance characteristics. The present invention seeks to take advantage of the properties achieved by the blends of the novel copolymer with overall purpose rubber by reducing the amount of the halogenated copolymer present to a minimum.

In the present invention, the copolymer/GPR blend is used to form an outer layer of the tire sidewall. At least one innerlayer, constructed using conventional GPR compounds is also provided which in turn reduces the amount of copolymer required by up to 50%. In this manner, the advantages of the novel copolymer blends are maintained while the amount of copolymer is significantly reduced.

In the preferred embodiment, the outermost layer of the tire sidewall comprises from about 10 to about 90 parts of a highly unsaturated rubber such as natural rubber, and from 10 to 90 parts of a brominated copolymer of an isoolefin and a para-alkylstyrene, wherein the alkylstyrene unit is halogenated (e.g. brominated) and characterized by the formula:

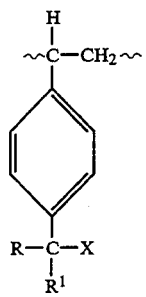

wherein R and $R^1$ are independently selected from the groups consisting of hydrogen, alkyl groups having from 1 to about 5 carbon atoms, and primary and secondary alkyl halides having about 1 to about 5 carbon atoms and x is selected from the halogen group consisting primarily of bromine, chlorine and mixtures thereof.

Furthermore, the halogenated para-alkylstyrene unit is shown as being pendant from the isoolefin polymer chain, represented by the wavy lines in the formula.

The inner layer or layers of the tire sidewall comprise one or more highly unsaturated rubber such as natural rubber.

The tire sidewall layers of the present invention can be compounded by methods generally known in the art, such as by mixing with the uncured polymers various fillers such as titanium dioxide; carbon black, when black sidewalls are desired, or non-black fillers and pigments; extenders such as rubber process oils; curing aids such as zinc oxide, sulfur; accelerators or retarders and other additives such as antioxidants and antiozonants.

DETAILED DESCRIPTION OF THE INVENTION

The principal advantages realized by practice of the present invention primarily stems from the fact that by employing a blend of a copolymer of an isoolefin and para-alkylstyrene with general purpose rubbers (GPR) as the outer layer of a multilayered sidewall one can achieve the same benefits if the blend were used to construct the entire tire sidewall with the blend. In other words, one can construct a tire sidewall with superior ozone resistance and flex fatigue crack resistance at a substantially lower cost than taught by the prior art.

The invention involves the construction of a multi-layered tire sidewall, the outer layer of which comprises a blend of a copolymer of an isoolefin and para-alkylstyrene with one or more unsaturated rubbers, usually referred to as general purpose rubbers (GPR). The sidewall also comprises one or more layers constructed from convention sidewall compositions such as those discussed in "The Vanderbilt Rubber Handbook" pp. 605 (1990).

The outer layer of the sidewall is fabricated from a blend composition comprising from about 10 to about 90 parts by weight per hundred of total rubber content of at least one highly unsaturated rubber selected from the group consisting of natural rubber, SBR, rubber, polyisoprene and polybutadiene rubber, preferably about 20 to about 80, more preferably about 30 to about 70 parts by weight; and from about 10 to about 90 parts by weight per hundred parts of rubber of a halogenated copolymer of an isoolefin and a para-alkylstyrene, wherein the halogen is bonded to the para-alkyl group of the para-alkylstyrene unit, more preferably about 20 to about 80 parts; for example about 30 to about 70 parts. In particularly preferred compositions useful in tire sidewalls, the halogenated copolymer comprises at least about 35 to 75 parts, for example, 40 parts, and the unsaturated rubber desirably comprises from 35 to 75 parts natural rubber and/or polybutadiene rubber. The outer layer blend may also optionally include from about 1 to about 90, preferably about 5 to about 40 parts of halobutyl rubber and/or from about 1 to about 40 parts, preferably about 5 to about 20 parts per hundred of ethylene-propylene-diene rubber (EPDM). The highly unsaturated rubber component of the outer layer may consist of a blend or mixture of two or more highly unsaturated rubbers.

When white sidewalls are desired, particularly preferred outer layer compositions comprise the halogenated para-alkylstyrene copolymers and natural rubber in a weight ratio of halogenated para-alkylstyrene copolymer to natural rubber ranging from about 0.28:1 to about 3:1, preferably about 0.67:1 to about 1:1. The preferred halogenated para-alkylstyrene copolymer for white sidewall outer layers comprises preferably from about 5 to about 15, more preferably from about 5 to about 10 weight percent para-alkylstyrene moieties and preferably from about 1 to about 20 weight percent, more preferably 2 weight percent halogen.

The inner layer or layers comprise one or more unsaturated rubbers selected from the group comprising natural rubber, styrene butadiene rubber, polybutadiene rubber. Typically such compositions comprise blends of natural rubber and polybutadiene rubber or blends of styrene butadiene rubber and polybutadiene rubber. The innerlayer may also comprise fillers such as carbon black, processing aids such as oils and antiozonants and other additives well known in the art.

The highly unsaturated rubbers of the present blend compositions are selected from the group consisting of natural rubbers, polyisoprene rubber, styrene butadiene rubber (SBR) and polybutadiene rubber and mixtures thereof. The natural rubbers of the present invention are selected from the group consisting of Malaysian rubber such as SMR CV, SMR 5, SMR 10, SMR 20, and SMR 50 and mixtures thereof, wherein the natural rubbers have a Mooney viscosity at 100° C. (ML 1+4) of about 30 to about 120, more preferably about 40 to about 65. The Mooney viscosity test referred to herein is in accordance with ASTM D-1646.

The Mooney viscosity of the polybutadiene rubber of the present invention as measured at 100° C. (ML 1+4) may range from about 40 to about 70, more preferably about 45 to about 65, and most preferably about 50 to about 60. When both natural rubber and polybutadiene are employed in the present invention, a suitable weight ratio of the natural rubber to the polybutadiene ranges from about 100 to 1 to 1 to 100, more preferably 5 to 1 to 1 to 5, and most preferably 2 to 1 to 1 to 2.

EPDM is the ASTM designation for a terpolymer of ethylene, propylene and a non-conjugated diolefin. In such terpolymers the ethylene and propylene form a fully saturated backbone of methylene linkages with the non-conjugated diolefin, e.g. dicyclopentadiene or substituted norbornene, attached so as to provide unsaturated side chains with readily available crosslinking sites for sulphur curing. The EPDM elastomers thus contain a fully saturated backbone which provides outstanding resistance to oxidation, ozone, and cracking, as well as excellent low temperature flexibility. The Mooney viscosity of the EPDM terpolymer as measured at 125° C. is about 20 to 80, more preferably about 25 to 75 and most preferably about 40 to about 60. The ethylene content of the EPDM terpolymers may range from about 20 to about 90 weight percent, preferably from about 30 to about 85, more preferably from about 35 to about 80 weight percent. The total diene monomer content in the EPDM terpolymers may suitably range from about 0.1 to about 15 weight percent, preferably from about 0.5 to about 12 weight percent.

The non-conjugated dienes may be straight chain or cyclic hydrocarbon diolefins having from 6 to 15 carbon atoms, such as dicyclopentadiene, including 5-methylene-2-norbornene, 5-vinyl-2-norbornene, 2-methylnorbornadiene, 2,4-dimethyl-2,7-octadiene, 1-4-hexadiene and 5-ethylidene-2-norbornene. The most preferred compounds include 5-methylene-2-norbornene, dicyclopenta-diene, 1,4-hexadiene and 5-ethylidene-2-norbornene. A preferred EPDM terpolymer of the present invention is Vistalon ® 6505 manufactured by Exxon Chemical Company.

The term "butyl rubber" as employed herein is intended to refer to a vulcanizable rubbery copolymer containing, by weight, from about 85 to 99.5% combined isoolefin having from 4 to 8 carbon atoms. Such copolymers and their preparation are well known. The isoolefin, such a isobutylene, is admixed with a conjugated diolefin having about 4 to 8 carbon atoms, such as butadiene or isoprene, preferably isoprene. An inert diluent selected from $C_4$ to $C_8$ aliphatic alkanes and chlorinated hydrocarbons such as methyl chloride, ethyl chloride, methylene chloride and ethylene dichloride are admixed therewith. The monomers may form from 10 to 50% by weight of the total monomer/diluent mixture. The mixture is cooled and polymerized in a reactor at a temperature in the range from about 0° C. to about 165° C. using a cationic catalyst such as aluminum chloride, aluminum bromide, aluminum ethyl dichloride, titanium tetrachloride or boron trifluoride. The polymerization reaction proceeds rapidly to produce a copolymer in the form of a slurry in the diluent. The slurry is removed from the reactor and the copolymer separated therefrom and recovered by well-known methods.

The preferred butyl rubbers which are used to produce halogenated rubbers useful in this invention are copolymers of isobutylene and isoprene which are normally produced using methyl chloride as diluent and aluminum trichloride catalyst. Preferably the copolymers have an isobutylene content of from about 95 to 99.5 weight percent. The halogenated copolymer should preferably contain at least about 0.5 weight percent of combined halogen, but not more than about one atom of chlorine or three atoms of bromine per double bond present in the original copolymer. Preferably, it contains from about 0.5 to about 2 weight percent of chlorine or from about 0.5 to about 5 weight percent bromine. Most preferably, the halogenated polymer is a halogenated butyl rubber containing from about 1.0 to about 1.5 weight percent chlorine or from about 1.0 to about 2.5 weight percent bromine. The halogenated isobutylene-isoprene copolymer rubber can also contain more than one halogen in its structure, e.g., chlorine and bromine.

The butyl rubber may be halogenated by means known in the art. The solid rubber may be reacted in an extruder using halogen gas or on a hot rubber mill or internal mixer with a compound which releases halogen such as N-halo-succinimide and N-halo-hydantoin. Alternatively, the butyl rubber may be dissolved in an inert hydrocarbon solvent such as pentane, hexane or cyclohexane and halogenated by addition to the solution of elemental chlorine or bromine. In a typical commercial process, butyl rubber is dissolved in a solvent to form a solution containing from about 5 to about 30 weight percent of rubber. Elemental chlorine or bromine is added to the solution, at a temperature of 0° to about 100° C., in sufficient quantity that the chlorinated or brominated rubber recovered contains up to 1 atom of chlorine or up to 3 atoms of bromine per carbon-carbon double bond originally in the butyl rubber.

The Mooney viscosity of the halobutyl rubbers useful in the instant invention as measured at 125° C. (ML 1+4) range from about 20 to about 80, more preferably about 25 to about 55, and most preferably about 30 to about 50.

Suitable halogen-containing copolymers of a $C_4$ to $C_7$ isomonoolefin and a para-alkylstyrene for use as a component of the present tire sidewall composition comprise at least 0.5 weight percent of the para-alkylstyrene moiety. For elastomeric copolymer products, the para-alkylstyrene moiety may range from about 0.5 weight percent to about 20 weight percent, preferably from about 1 to about 20 weight percent, more preferably from about 2 to about 20 weight percent of the copolymer. The halogen content of the copolymers may range from above zero to about 7.5 weight percent, preferably from about 1.0 to about 7.5 weight percent. The halogen may be bromine, chlorine, and mixtures thereof. Preferably, the halogen is bromine. The major portion of the halogen is chemically bound to the para-alkyl group, that is, the halogen-containing copolymer comprises para-halo alkyl groups. Particularly preferred copolymers comprise from about 5 to about 10 weight percent para-alkylstyrene, and from about 1 to about 2 weight percent halogen, for example, bromine.

The copolymers of the isomonoolefin and para-alkylstyrene useful to prepare the halogen-containing copolymers suitable as component of the tire sidewall composition of the present invention include copolymers of isomonoolefin having from 4 to 7 carbon atoms and a para-alkylstyrene, such as those described in U.S. Pat. No. 5,162,445. The preferred isomonoolefin comprises isobutylene. The preferred para-alkylstyrene comprises para-methylstyrene. Suitable copolymers of an isomonoolefin and a para-alkylstyrene include copolymers having a number average molecular weight ($\overline{Mn}$) of at least about 25,000, preferably at least about 30,000, more preferably at least about 100,000. The copolymers also, preferably, have a ratio of weight average molecular weight ($\overline{Mw}$) to number average molecular weight ($\overline{Mn}$), i.e., $\overline{Mw}/\overline{Mn}$ of less than about 6, preferably less than about 4, more preferably less than about 2.5, most preferably less than about 2. The brominated copolymer of the isoolefin and para-alkylstyrene obtained by the polymerization of these particular monomers under certain specific polymerization conditions now permit one to produce copolymers which comprise the direct reaction product (that is, in their as-polymerized form), and which have unexpectedly homogeneous uniform compositional distributions. Thus, by utilizing the polymerization and bromination procedures set forth herein, the copolymers suitable for the practice of the present invention can be produced. These copolymers, as determined by gel permeation chromatography (GPC) demonstrate narrow molecular weight distributions and substantially homogeneous compositional distributions, or compositional uniformity over the entire range of compositions thereof. At least about 95 weight percent of the copolymer product has a para-alkylstyrene content within about 10 wt. percent, and preferably within about 7 wt. percent, of the average para-alkylstyrene content for the overall composition, and preferably at least about 97 wt. percent of the copolymer product has a para-alkylstyrene content within about 10 wt. percent and preferably within about 7 wt. percent, of the average para-alkylstyrene content for the overall composition. This substantially homogeneous compositional uniformity thus particularly relates to the intercompositional distribution. That is, with the specified copolymers, as between any selected molecular weight fraction the percentage of para-alkylstyrene therein, or the ratio of para-alkylstyrene to isoolefin, will be substantially the same, in the manner set forth above.

In addition, since the relative reactivity of para-alkylstyrene with isoolefin such as isobutylene is close to one, the intercompositional distribution of these copolymers will also be substantially homogeneous. That is, these copolymers are essentially random copolymers, and in any particular polymer chain the para-alkylstyrene and isoolefin units will be essentially randomly distributed throughout that chain.

The halogen-containing copolymers useful in the practice of the present invention have a substantially homogeneous compositional distribution and include the para-alkylstyrene moiety represented by the formula:

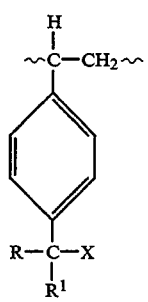

in which R and $R^1$ are independently selected from the group consisting of hydrogen, alkyl preferably having from 1 to 5 carbon atoms, primary haloalkyl, secondary haloalkyl preferably having from 1 to 5 carbon atoms, and mixtures thereof and X is selected from the group consisting of bromine, chlorine and mixtures thereof, such as those disclosed in U.S. Pat. No. 5,162,445, the teachings of which are incorporated by reference.

Various methods may be used to produce the copolymers of isomonoolefin and para-alkylstyrene, as described in said European publication. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvent prior to introducing monomers and catalysts.

Reactors which are typically used in butyl rubber polymerization are generally suitable for use in a polymerization reaction to produce the desired para-alkylstyrene copolymers suitable for use in the process of the present invention. The polymerization temperature may range from about minus 35° C. to about minus 100° C., preferably from about minus 40° to about minus 80° C.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentration of up to 40 wt. percent of polymer are possible.

The copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene, chloride, chloroform, carbon tetrachloride, methyl chloride, with methyl chloride being particularly preferred.

An important element in producing the copolymer is the exclusion of impurities from the polymerization reactor, namely, impurities which, if present, will result in complexing with the catalyst or copolymerization with the isomonoolefins or the para-alkylstyrene, which in turn will prevent one from producing the para-alkylstyrene copolymer product useful in the practice of the present invention. Most particularly, these impurities include the catalyst poisoning material, moisture and other copolymerizable monomers, such as, for example, meta-alkylstyrenes and the like. These impurities should be kept out of the system.

In producing the suitable copolymers, it is preferred that the para-alkylstyrene be at least 95.0 wt. percent pure, preferably 97.5 wt. percent pure, most preferably 99.5 wt. percent pure and that the isomonoolefin be at least 99.5 wt. percent pure, preferably at least 99.8 wt. percent pure and that the diluents employed be at least 99 wt. percent pure, and preferably at least 99.8 wt. percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 wt. percent and preferably from about 0.001 to 0.2 wt. percent, based upon the total amount of monomer to be polymerized.

Halogenation of the polymer can be carried out in the bulk phase (e.g., melt phase) or either in solution or in a finely dispersed slurry. Bulk halogenation can be effected in an extruder, or other internal mixer, suitably modified to provide adequate mixing and for handling the halogen and corrosive by-products of the reaction. The details of such bulk halogenation processes are set forth in U.S. Pat. No. 4,548,995, which is hereby incorporated by reference.

Suitable solvents for solution halogenation include the low boiling hydrocarbons ($C_4$ to $C_7$) and halogenated hydrocarbons. Since the high boiling point para-methylstyrene makes its removal by conventional distillation impractical, and since it is difficult to completely avoid solvent halogenation, it is very important where solution or slurry halogenation is to be used that the diluent and halogenation conditions be chosen to avoid diluent halogenation, and that residual para-methylstyrene has been reduced to an acceptable level.

With halogenation of para-methylstyrene/isobutylene copolymers, it is possible to halogenate the ring carbons, but the products are rather inert and of little interest. However, it is possible to introduce halogen desired functionality into the para-methylstyrene/isobutylene copolymers hereof in high yields and under practical conditions without obtaining excessive polymer breakdown, cross-linking or other undesirable side reactions.

It should be noted that radical bromination of the enchained para-methyl styryl moiety in the useful copolymers for the practice of this invention can be made highly specific with almost exclusive substitution occurring on the para-methyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.).

Thus, solutions of the suitable para-methylstyrene/isobutylene copolymers in hydrocarbon solvents such as pentane, hexane or heptane can be selectively brominated using light, heat, or selected radical initiators (according to conditions, i.e., a particular radical initiator must be selected which has an appropriate half-life for the particular temperature conditions being utilized, with generally longer half-lives preferred at warmer hydrogenation temperatures) as promoters of radical halogenation, to yield almost exclusively the desired benzylic bromine functionality, via substitution on the para-methyl group, and without appreciable chain scission and/or crosslinking.

This reaction can be initiated by formation of a bromine atom, either photochemically or thermally (with or without the use of sensitizers), or the radical initiator used can be one which preferentially reacts with a bromine molecule rather than one which reacts indiscriminately with bromine atoms, or with the solvent or polymer (i.e., via hydrogen abstraction). The sensitizers referred to are those photochemical sensitizers which will themselves absorb lower energy photons and disassociate, thus causing, in turn, disassociation of the bromine, including materials such as iodine. It is, thus, preferred to utilize an initiator which has a half life of between about 0.5 and 2500 minutes under the desired reaction conditions, more preferably about 10 to 300 minutes. The amount of initiator employed will usually vary between 0.02 and 1 percent by weight on the copolymer, preferably between about 0.02 and 0.3 percent. The preferred initiators are bis azo compounds, such as azo bis isobutyronitrile (AIBN), azo bis (2,4 dimethyl valero) nitrile, azo bis (2 methyl butyro) nitrile, and the like. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as crosslinking. The radical bromination reaction of the copolymers of para-methylstyrene and isobutylene is highly selective, and almost exclusively produces the desired benzylic bromine functionality. Indeed, the only major side reaction which appears to occur is disubstitution at the para-methyl group, to yield the dibromo derivative, but even this does not occur until more than about 60 percent of the enchained para-methylstyryl moieties have been monosubstituted. Hence, any desired amount of benzylic bromine functionality in the monobromo form can be introduced into the above stated copolymers, up to about 60 mole percent of the para-methylstyrene content.

It is desirable that the termination reactions be minimized during bromination, so that long, rapid radical chain reactions occur, and so that many benzylic bromines are introduced for each initiation, with a minimum of the side reactions resulting from termination. Hence, system purity is important, and steady-state radical concentrations must be kept low enough to avoid extensive recombination and possible cross-linking. The reaction must also be quenched once the bromine is consumed, so that continued radical production with resultant secondary reactions (in the absence of bromine) do not then occur. Quenching may be accomplished by cooling, turning off the light source, adding dilute caustic, the addition of a radical trap, or combinations thereof.

Since one mole of HBr is produced for each mole of bromine reacted with or substituted on the enchained para-methylstyryl moiety, it is also desirable to neutralize or otherwise remove this HBr during the reaction, or at least during polymer recovery in order to prevent it from becoming involved in or catalyzing undesirable side reactions. Such neutralization and removal can be accomplished with a post-reaction caustic wash, generally using a molar excess of caustic on the HBr. Alternatively, neutralization can be accomplished by having a particulate base (which is relatively nonreactive with bromine) such as calcium carbonate powder present in dispersed form during the bromination reaction to absorb the HBr as it is produced. Removal of the HBr can also be accomplished by stripping with an inert gas (e.g., $N_2$) preferably at elevated temperatures.

The brominated, quenched, and neutralized para-methylstyrene/isobutylene copolymers can be recovered and finished using conventional means with appropriate stabilizers being added to yield highly desirable and versatile functional saturated copolymers.

In summary, halogenation to produce a copolymer useful in the present invention is preferably accomplished by halogenating an isobutylene-para-methylstyrene copolymer using bromine in a normal alkane (e.g., hexane or heptane) solution utilizing a bis azo initiator, e.g., AIBN or VAZO ® 52: 2,2'-azobis(2,4-dimethylpentane nitrile), at about 55° to 80° C., for a time period ranging from about 4.5 to about 30 minutes, followed by a caustic quench. The recovered polymer is washed in basic water wash and water/isopropanol washes, recovered, stabilized and dried.

The aromatic halomethyl groups permit facile crosslinking to be accomplished in a variety of ways, for example, either directly through the halomethyl group or by conversion to other functional groups, as indicated above, to permit the desired crosslinking reactions to be employed. Direct crosslinking can be effected with a variety of polyfunctional nucleophilic reagents such as ammonia, amines, or polyamines; metal dicarboxylates; metal dithiolates; promoted metal oxides (e.g., ZnO+zinc stearates and/or dithiocarbamates), etc. Crosslinking can also be effected via polyalkylation reactions. The aromatic halomethyl groups thus provide a wide choice of crosslinking reactions which can be used.

Various fillers can also be used in the outer and/or inner layer blend compositions of the present invention, and these include a variety of carbon blacks, clays, silicas, carbonates, oils, resins, and waxes. Carbon blacks preferred for use in black tire sidewall compositions of this invention include those types designated N339, N774, N660, N351 and N375; the latter two types are particularly preferred. Alternatively, non-black fillers and pigments may be used for white tire sidewalls. The blends are cured with conventional curatives for highly unsaturated or chlorobutyl rubbers, including sulphur, alkylphenol disulphide, zinc oxide, sulphenamide derivatives, guanidines, benzothiazyldisulphide (MBTS) and mercaptobenzothiazole (MBT).

When constructing tires employing the sidewalls of the invention, the thickness of the inner and outer layers will vary depending upon the type and size of the tires being built. Typically for a passenger car tire, the outer layer thickness may vary from about 0.8 mm to about 2.0 mm. The innerlayer may vary from about 1.0 mm to about 2.0 mm with an overall sidewall thickness of up to about 3.0 mm. For example, a tire size 185/60-HR-14 would have a sidewall width of about 95 mm and an overall length of about 1210 mm.

The layered tire sidewall composition of the present invention may be vulcanized by subjecting it to heat and/or light or radiation according to any vulcanization process. Typically, the vulcanization is conducted at a temperature ranging from about 100° C. to about 250° C., preferably from about 140° C. to about 200° C., for a time period ranging from one minute to several hours.

The layered tire sidewall of the present invention may be used as the sidewall for motor vehicle tires such as truck tires, bus tires, passenger automobile, motorcycle tires, and the like.

Suitable tire sidewall layer compositions may be prepared by using conventional mixing techniques including, e.g., kneading, roller milling, extruder mixing, internal mixing (such as with a Banbury ® mixer), etc. The sequence of mixing and temperatures employed are well known to the skilled rubber compounder, the objective being the dispersion of fillers, activators and curatives in the polymer matrix without excessive heat buildup. A useful mixing procedure utilizes a Banbury mixer in which the rubber components, fillers, and plasticizer are added and the composition mixed for the desired time or to a particular temperature to achieve adequate dispersion of the ingredients. Alternatively, the rubbers and a portion of the fillers (e.g., one-third to two-thirds) is mixed for a short time (e.g., abut 1 to 3 minutes) followed by the remainder of the fillers and oil. Mixing is continued for about 5 to 10 minutes at high rotor speed during which time the mixed components reach a temperature of about 140° C. Following cooling, the components are mixed in a second step on a rubber mill or in a Banbury mixer during which the curing agent and optional accelerators, are thoroughly and uniformly dispersed at relatively low temperature, e.g., about 80° to about 105° C. Variations in mixing will be readily apparent to those skilled in the art and the present invention is not limited to any specific mixing procedure. The mixing is performed to disperse all components of the composition thoroughly and uniformly.

Tires are generally built on a drum from at least three layers, namely, an outer layer comprising a tread portion and sidewalls comprising the inner and outer layers of this invention, an intermediate layer, and an inner layer. After the uncured tire has been built on a building drum, the uncured tire may be placed in a heated mold to shape it and heat it to vulcanization temperatures and, thereby, to produce a cured unitary tire from the multi-layers.

Vulcanization of a molded tire, typically, is carried out in heated presses under conditions well known to those skilled in the art.

Curing time will be affected by the thickness of the tire to be molded and the concentration and type of curing agent as well as the halogen content of the halogenated copolymer. However, the vulcanization parameters can readily be established with a few experiments utilizing e.g., a laboratory characterization device well known in the art, the Monanto Oscillating Disc Cure Rheometer (ODR, described in detail in American Society for Testing and Materials, Standard ASTM D 2084).

Tires produced according to the present invention would offer a low cost, black sidewall tire with the features of a more expensive tire wherein the entire sidewall comprises the halogenated copolymer. In the present tire, by using the halogenated copolymer in only the outerlayer, good ozone resistance is achieved. In addition, the outerlayer acts as a barrier preventing migration of additives in protectants from the innerlayer to the outside, thus eliminating the staining and discoloring problem discussed above.

The following examples are presented to illustrate the invention. All parts and percentages herein are by weight unless otherwise specified.

EXAMPLE I

A multilayer tire sidewall was prepared according to the present invention. The composition of the inner and outer layers is shown in Table I. Identification of the components used is found in Table III.

The inner and outer sidewall layers were then cured and subjected to a series of physical tests, the results of which are listed in Table II.

TABLE I

| Component | Wt % |
|---|---|
| OUTER LAYER FORMULATION | |
| NR/SIR 5 (1) | 10 |
| BR 122 0 (2) | 50 |
| Copolymer (3) | 40 |
| Carbon Black (L5) | 40 |
| FLEXON ® 641 (7) | 12 |
| Stearic Acid | 1 |
| STRUKFOL ® 40 MS (9) | 5 |
| ESCOREZ ® 1102 | 5 |
| ZnO | 1 |
| Sulfur | 0.3 |
| MBTS (12) | 1 |
| VULTAC ® 5 (13) | 0.7 |
| INNER LAYER FORMULATION | |
| NR SIR 5 (1) | 50 |
| SBR 1500 (4) | 25 |
| BR 1220 (2) | 25 |
| Carbon Black (6) | 50 |
| Aromatic Oil EZL-810 (8) | 10 |
| Stearic Acid | 1.5 |
| ZnO | 3 |
| FLECTOL ® H (11) | 1 |
| Sulfur | 3 |
| CBS (14) | 1.1 |
| DPG (15) | 0.1 |

TABLE II

| OUTER LAYER | |
|---|---|
| Monsanto RHEOMETER (ODR 2000) | |
| 180 deg. C./Arc 3/15 min. | |
| Ml(dNm) | 55 |
| MH(dNm) | 10 |
| Tc2(min.) | 1.75 |
| Tc50(min.) | 3.6 |
| Tc90(min.) | 5.45 |
| Physical Properties @ 180 degC./Tc90*1.1 | |
| Hardness, SHORE A | 47 |
| Mod.100 (MPa) | 1.4 |
| Mod.300(MPa) | 6.35 |
| Tens. Strength(Mpa) | 10.8 |
| Elongation(%) | 465 |

TABLE II-continued

INNERLAYER

Monsanto RHEOMETER (ODR 2000)
180 deg. C./Arc 3/15 min.

| | |
|---|---|
| Ml(dNM) | 92 |
| MH(dNm) | 11 |
| Tc2(min.) | 1.4 |
| Tc50(min.) | 2.3 |
| TC90(min.) | 2.65 |
| Physical Properties @ 180 deg.C./Tc90*1.1 | |
| Hardness, SHORE A | 56 |
| Mod.100(MPa) | 2.2 |
| Mod.300(MPa) | 10.5 |
| Tens, Strenght(MPa) | 14.5 |
| Elongation(%) | 370 |

TABLE III

SIDEWALL COMPONENTS (1) Natural Rubber -
(2) Solution polybutadiene rubber - Taktene 1220 manufactured by Polysar.
(3) Brominated isobutylene/paramethyl styrene with 7.5 wt % paramethyl styrene and 2 wt % bromine manufactured by Exxon Chemical Company.
(4) Styrene-Butadiene Rubber
(5) Carbon Black - ASTM N351
(6) Carbon Black - ASTM N660
(7) Naphthenic Rubber Processing Oil
(8) Aromatic Rubber Processing Oil
(9) Blend of aliphatic - napthlenic - aromatic resins
(10) modified aromatic resin
(11) polymerized 1,2,-dihydro-2,2,4-trimethyl quinone.
(12) Accelerator - Dibenzothiazole disulfide
(13) Alkyl phenol disulfide
(14) cyclo hexylbenzothiazole sulfonamide
(15) Diphenyl guanidine.

EXAMPLE II

Tire sidewall were constructed using the inner and outer layers fabricated using the formula shown in Example I. These sidewalls were subjected to a series of ozone resistance tests, the results of which are shown in Table IV. In addition, commercial tire sidewalls were tested for ozone resistance.

TABLE IV

| | RESULTS | |
|---|---|---|
| | Invention | Commercial Sidewall |
| VW-Ozone cracking (200 pphm, 25° C., 48 hrs) | No Cracking | Cracking |
| VW-Ozone (Extended) (300 pphm, 25° C., 72 hrs) | No Cracking | Cracking |
| Ford-Ozone (50 pphm, 38° C., 3 days) | No Cracking | Cracking |
| Dynamic ozone (110 pphm, 20% ext. 15 cycles/min, 25° C.) | | |
| 6 hrs | No Cracking | Cracking |
| 31 hrs | No Cracking | Failure |

In addition, a tire sidewall of the invention was subjected to an ozone precut test at 48 hours at 200 pphm, 25° C. and 300 pphm for 72 hours at 25° C. No growth in the cut was observed.

The experiments above show that the tire sidewalls of the invention exhibit superior ozone resistance when compared to conventional sidewalls even with an ozone protectant while exhibiting comparable strength.

What is claimed is:

1. A multilayered tire sidewall comprising:
   a) an outerlayer comprising a blend of a copolymer of an isoolefin and a para-alkylstyrene and a unsaturated rubber; and
   b) an inner layer comprising a highly saturated rubber or blend of unsaturated rubbers.

2. The tire sidewall of claim 1 wherein said copolymer comprise from about 0.5 to about 15 weight percent of said para-alkylstyrene.

3. The tire sidewall of claim 1 wherein said isoolefin is isobutylene.

4. The tire sidewall of claim 1 wherein said para-alkylstyrene is para-methylstyrene.

5. The tire sidewall of claim 1 wherein said high unsaturated rubber in said outer layer is selected from the group consisting of natural rubber, styrene butadiene rubber, polybutadiene rubber and mixtures thereof.

6. The tire sidewall of claim 1 wherein said highly unsaturated rubber of said inner layer is selected from the group consisting of natural rubber, styrenebutadiene rubber, polybutadiene rubber and mixtures thereof.

7. The tire sidewall of claim 1 wherein said outer layer has a thickness of between 0.8 and 2.0 mm and said inner layer has a thickness of between 1.0 and 2.0 mm.

8. The tire sidewall of claim 1 wherein said outer layer further comprises a filler.

9. The tire sidewall of claim 8 wherein said filler is selected from the group consisting of titanium dioxide, and carbon black.

10. A multilayer tire sidewall comprising:
    a) an outerlayer comprising 10 to 90 parts per hundred of total rubber of a random copolymer of an isomonoolefin and para-alkylstyrene and 90 to 10 parts per hundred of total rubber of a highly unsaturated rubber or a mixture of highly unsaturated rubber; and
    b) an inner layer comprising one or more highly unsaturated rubbers.

11. The tire sidewall of claim 1 wherein said outer layer further comprises 1 to about 90 parts per hundred of total rubber halobutyl rubber.

12. The tire sidewall of claim 4 wherein said outer layer further comprises 1 to 40 parts per hundred of total rubber of ethylene-propylene-diene rubber.

13. The tire sidewall of claim 10 wherein said outer layer further comprises a filler.

14. The tire sidewall of claim 13 wherein filler comprises carbon black.

15. The tire sidewall of claim 10 wherein said isomonoolefin is butylene and said para-alkylstyrene is para-methylstyrene.

16. The tire sidewall of claim 10 wherein said random copolymer comprise 0.5 to 20 weight percent para-alkylstyrene and 1 to 2 percent halogen.

* * * * *